United States Patent
Higuchi et al.

(10) Patent No.: US 9,963,169 B2
(45) Date of Patent: May 8, 2018

(54) VEHICLE BODY FRAME

(71) Applicant: HONDA MOTOR CO., LTD., Tokyo (JP)

(72) Inventors: Eisei Higuchi, Wako (JP); Hirokazu Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/492,144

(22) Filed: Apr. 20, 2017

(65) Prior Publication Data

US 2017/0259851 A1    Sep. 14, 2017

Related U.S. Application Data

(63) Continuation of application No. PCT/JP2015/083561, filed on Nov. 30, 2015.

(30) Foreign Application Priority Data

Dec. 18, 2014 (JP) ................. 2014-256369

(51) Int. Cl.
| | |
|---|---|
| B60N 99/00 | (2006.01) |
| B62D 21/15 | (2006.01) |
| B62D 25/08 | (2006.01) |
| B62D 25/02 | (2006.01) |
| B62D 29/00 | (2006.01) |
| B62D 27/02 | (2006.01) |

(52) U.S. Cl.
CPC ............. B62D 21/15 (2013.01); B62D 25/02 (2013.01); B62D 25/08 (2013.01); B62D 27/023 (2013.01); B62D 29/007 (2013.01)

(58) Field of Classification Search
CPC ........ B62D 21/15; B62D 25/02; B62D 25/08; B62D 27/023; B62D 29/007
See application file for complete search history.

(56) References Cited

U.S. PATENT DOCUMENTS

| | | | |
|---|---|---|---|
| 2015/0166106 A1* | 6/2015 | Kim ....................... | B62D 21/15 296/187.03 |
| 2015/0360725 A1* | 12/2015 | Yoshida ................. | B62D 25/04 296/203.01 |

FOREIGN PATENT DOCUMENTS

| | | |
|---|---|---|
| JP | H05-105110 | 4/1993 |
| JP | 6-027439 | 4/1994 |
| JP | 2012-180082 | 9/2012 |
| JP | 2012-528752 | 11/2012 |
| WO | 2010/126423 | 11/2010 |
| WO | 2013/061408 | 5/2013 |

OTHER PUBLICATIONS

International Search Report, dated Feb. 16, 2016 (Feb. 16, 2016).

* cited by examiner

*Primary Examiner* — Lori L Lyjak
(74) *Attorney, Agent, or Firm* — Rankin, Hill & Clark LLP

(57) ABSTRACT

A vehicle body frame includes a first vertical bead portion (38) adjacent to an inner ridge line (54), a first strain development region (39) defined by an arc (67) of a minimum distance (L1) between the first vertical bead portion (38) and an outer ridge line (55), a second vertical bead portion (41) adjacent to the outer ridge line (55), and a second strain development region (42) defined by an arc (68) of the minimum distance (L1) between the second vertical bead portion (41) and the inner ridge line (54).

5 Claims, 10 Drawing Sheets

VEHICLE BODY FRAME

This application is a continuation of International Patent Application No. PCT/JP2015/083561 filed on Nov. 30, 2015, and claims priority to Japanese Patent Application No. 2014-256369 filed on Dec. 18, 2014, the entire content of both of which is incorporated herein by reference.

TECHNICAL FIELD

The present invention relates to a vehicle body frame formed into a hollow by a top portion, a bottom portion, and a pair of side walls, having a pair of ridge lines on the top portion side or bottom portion side, and extending in the vehicle longitudinal direction.

BACKGROUND ART

A vehicle body (in particular, a vehicle body frame) is required to reduce its weight for the purpose of, for example, improving the fuel consumption of a vehicle. To cope with weight reduction of a vehicle body frame, there is known a technique of thinning the vehicle body frame to reduce its weight by using a frame of a high strength.

As a weight reducing means, for example, it is known that a high-tensile steel plate (so-called high tension material) is employed as a vehicle body frame, or a frame of a high strength made by hot-stamping (that is, hot-pressing) a blank material of a steel plate using a forming die is employed as a vehicle body frame. The frame of a high strength made by hot stamping will be referred to as a high-strength frame hereinafter.

When the high-strength frame is employed as a vehicle body frame such as the center pillar, front side frame, or rear side frame of a vehicle body, the vehicle body frame can be thinned, and the weight of the vehicle body can be reduced.

The front side frame or rear frame of the vehicle body frame normally incorporates reinforcing members partially arranged to reinforce the frame or absorb an impact load (impact energy). The reinforcing members are partially arranged to generate a strength difference between predetermined portions of each frame to facilitate deformation of the frame, thereby absorbing the impact load.

However, when the reinforcing members are arranged in each frame, the weight of the front side frame or rear frame increases.

On the other hand, if a high-strength frame is employed as the front side frame or rear frame for weight reduction, each frame need not be reinforced by reinforcing members, and the weight of the vehicle body can be reduced. However, since no reinforcing member is provided in each frame, it is difficult to generate a strength difference by reinforcing members.

For this reason, each frame is hardly deformed by an input impact load, and the front side frame or rear frame can hardly absorb the input impact load.

As a measure against this, it is known that a front side frame employing a high-strength frame is formed such that its strength continuously rises from the front end to the rear side of the vehicle body (for example, see Japanese PCT National Publication No. 2012-528752).

According to the front side frame of Japanese PCT National Publication No. 2012-528752, the strength of the front portion of the front side frame is suppressed. Hence, if the vehicle collides against a hard object such as a concrete wall, it is possible to absorb the impact load by sequentially buckling and deforming the front portion of the front side frame by axial collapse.

However, if the vehicle collides against an object (for example, a vehicle) softer than a concrete wall, the front portion of the front side frame is considered to be buried in the soft colliding object. It is therefore difficult to absorb the impact load by sequentially buckling and deforming the front portion of the front side frame by axial collapse.

Additionally, if the front portion of the front side frame is buried in the colliding object, the front portion of the front side frame is supported by the colliding object. Hence, it is considered that a bending moment acts on the buried front portion of the front side frame.

The front side frame is a hard member because a high-strength frame is employed. For this reason, if a bending moment acts on the front portion of the front side frame, the front portion of the front side frame may become cracked.

It is also considered that the front side frame deforms and absorbs the impact load in the state in which the front portion of the front side frame is buried in the colliding object. However, if the front side frame deforms in the state in which the front portion of the front side frame is buried in the colliding object, the deforming portion of the front side frame can hardly be determined to a predetermined position. That is, the position where the front side frame deforms cannot be known.

Hence, since the shock absorbing performance of the front side frame is unstable, there is room for improvement from this viewpoint.

SUMMARY OF INVENTION

The present invention provides a vehicle body frame capable of stabilizing shock absorbing performance even when colliding with a soft object such as a vehicle.

According to a first aspect of the invention, there is provided a vehicle body frame formed into a hollow by a top portion, a bottom portion, and a pair of side walls, having a pair of ridge lines formed by intersections between at least one of the top portion and the bottom portion and the pair of side walls, and extending in a vehicle longitudinal direction, comprising a first vertical bead portion formed on one of the pair of side walls into a concave shape toward the hollow, extending in a vertical direction, and located adjacent to one of the pair of ridge lines, a first strain development region having, as a radius, a minimum distance in a vehicle width direction, which is a distance between the first vertical bead portion and the other of the pair of ridge lines, a second vertical bead portion formed on the other of the pair of side walls into a concave shape toward the hollow, extending in the vertical direction, and located adjacent to the other of the pair of ridge lines, and a second strain development region having, as a radius, a minimum distance in the vehicle width direction, which is a distance between the second vertical bead portion and the one of the pair of ridge lines, wherein the first vertical bead portion and the second vertical bead portion are spaced apart in the vehicle longitudinal direction of the vehicle body frame, and the first strain development region and the second strain development region are spaced apart in a state before deformation of the vehicle body frame.

According to a second aspect of the invention, preferably, the first strain development region and the second strain development region overlap each other halfway through the deformation of the hollow vehicle body frame.

According to a third aspect of the invention, preferably, the hollow vehicle body frame is formed into a high strength of about 1500 MPa, and the first vertical bead portion and the second vertical bead portion are softened to 590 to 1000 MPa.

The hollow vehicle body frame is formed into a high strength, and the first vertical bead portion and the second vertical bead portion are formed in the vehicle body frame. For this reason, when an impact load is input to the vehicle body frame, stress concentrates on the first vertical bead portion and the second vertical bead portion due to the input impact load.

Hence, the third aspect of the invention, the first vertical bead portion and the second vertical bead portion are softened.

In a fourth aspect of the invention, preferably, at least one of the top portion and the bottom portion includes a soft portion that is deformable and extends in a strip shape to connect the first vertical bead portion and the second vertical bead portion.

In a fifth aspect of the invention, preferably, a U-shaped portion having a substantially U-shaped section is formed by the bottom portion and the pair of side walls, the top portion is joined to a lower frame portion including the U-shaped portion by spot welding, thereby forming the hollow vehicle body frame, the spot welding is located in a portion except the first vertical bead portion and the second vertical bead portion, and a pitch to prevent distortion concentration on a joint portion by the spot welding when deforming the vehicle body frame is set.

In the first aspect of the invention, the first vertical bead portion is formed to be adjacent to one ridge line of the hollow vehicle body frame, and the second vertical bead portion is formed to be adjacent to the other ridge line.

Hence, if an impact load is input to the vehicle body frame, the first vertical bead portion and the second vertical bead portion start deforming due to the input impact load. That is, each of the first vertical bead portion and the second vertical bead portion functions as a trigger (that is, a starting point) to deform the vehicle body frame.

The first strain development region is provided around the first vertical bead portion, and the second strain development region is provided around the second vertical bead portion. The first strain development region and the second strain development region are spaced apart in a state before deformation of the vehicle body frame.

Hence, after the first vertical bead portion and the second vertical bead portion start deforming, the first strain development region and the second strain development region start deforming. When the first strain development region and the second strain development region deform, the second strain development region displaces with respect to one ridge line corresponding to the first vertical bead portion as the center.

The first strain development region and the second strain development region are spaced apart. It is therefore possible to efficiently individually deform the first strain development region and the second strain development region. The second vertical bead portion can thus smoothly be displaced with respect to the other ridge line corresponding to the first vertical bead portion as the center. That is, it is possible to suitably buckle and deform the vehicle body frame by bending it into a Z shape.

By suitably buckling and deforming the vehicle body frame in this way, the impact load can satisfactorily be absorbed even in collision against a soft object such as a vehicle. The shock absorbing performance of the vehicle body frame can thus be stabilized.

In the second aspect of the invention, the first strain development region and the second strain development region overlap each other halfway through the deformation of the vehicle body frame. When the first strain development region and the second strain development region are arranged so as to overlap each other, the shift between a first frame on the side of the first vertical bead portion and a second frame on the side of the second vertical bead portion in the vehicle width direction can be suppressed small.

Hence, even if the vehicle body frame is bent into a Z shape, the first frame and the second frame can collide again to absorb the impact without passing each other.

That is, the first frame and the second frame 21b can cause so-called secondary collision, and a reaction load can be generated in the first frame and the second frame. By generating the reaction load in the first frame and the second frame, the vehicle body frame can more suitably be buckled and deformed, and the absorption amount of the impact load (impact energy) can be increased.

In the third aspect of the invention, the vehicle body frame is formed into an ultrahigh strength. This can minimize the board thickness of the vehicle body frame, and the vehicle body frame can be made lightweight.

In addition, the first vertical bead portion and the second vertical bead portion are softened. Hence, the first vertical bead portion and the second vertical bead portion can be changed to ductile portions. Accordingly, the first vertical bead portion and the second vertical bead portion can suitably be deformed by the impact load input to the vehicle body frame, and the impact load can satisfactorily be absorbed. This can prevent stress from concentrating on the first vertical bead portion and the second vertical bead portion to cause rupture.

In the fourth aspect of the invention, at least one of the top portion and the bottom portion includes a deformable soft portion, and the soft portion is extended in a strip shape to connect the first vertical bead portion and the second vertical bead portion. The strip-shaped soft portion is obliquely extended up to the first vertical bead portion and the second vertical bead portion.

Hence, if the impact load is input to the vehicle body frame, shearing forces in opposite directions are generated in one side and the other side of the soft portion. Accordingly, bending moments to bend the vehicle body frame into a Z shape are generated in the first vertical bead portion and the second vertical bead portion.

The bending moments can smoothly deform the soft portion and promote buckling deformation of the vehicle body frame.

In addition, when the soft portion is provided in at least one of the top portion and the bottom portion, the vehicle body frame can be prevented from being cracked or ruptured by the impact load input to the vehicle body frame.

As described above, when buckling deformation of the vehicle body frame is promoted, and the vehicle body frame is prevented from being cracked or ruptured, the shock absorbing performance of the vehicle body frame can be stabilized.

In the fifth aspect of the invention, the top portion is joined to a lower frame portion by spot welding, thereby forming the hollow vehicle body frame. In addition, the pitch of spot welding is set to a pitch to prevent distortion concentration on joint portions by the spot welding when deforming the vehicle body frame.

By preventing distortion concentration on the joint portions by the spot welding when deforming the vehicle body frame, deformation (that is, buckling deformation) of the vehicle body frame from the first vertical bead portion and the second vertical bead portion both serving as the starting points can be promoted.

In addition, by preventing distortion concentration on the joint portions by the spot welding when deforming the vehicle body frame, the joint portions can be prevented from being cracked or ruptured.

As described above, by promoting buckling deformation caused by bending the hollow vehicle body frame and preventing the joint portions from being cracked or ruptured, the shock absorbing performance of the vehicle body frame can be stabilized.

Since the spot welding is located in a portion except the first vertical bead portion and the second vertical bead portion, deformation of the first vertical bead portion and the second vertical bead portion can be promoted.

DESCRIPTION OF EMBODIMENTS

The best mode for carrying out the present invention will now be described with reference to the accompanying drawings. Note that "front (Fr)", "rear (Rr)", "left (L)", and "right (R)" comply with directions viewed from a driver.

Embodiment

Vehicle body frames 20 and 21 according to the embodiment will be described.

Note that in the embodiment, left and right rear frame rear portions will be exemplified as the vehicle body frames 20 and 21. However, the vehicle body frame can also be applied to left and right front side frames.

Figure 1:
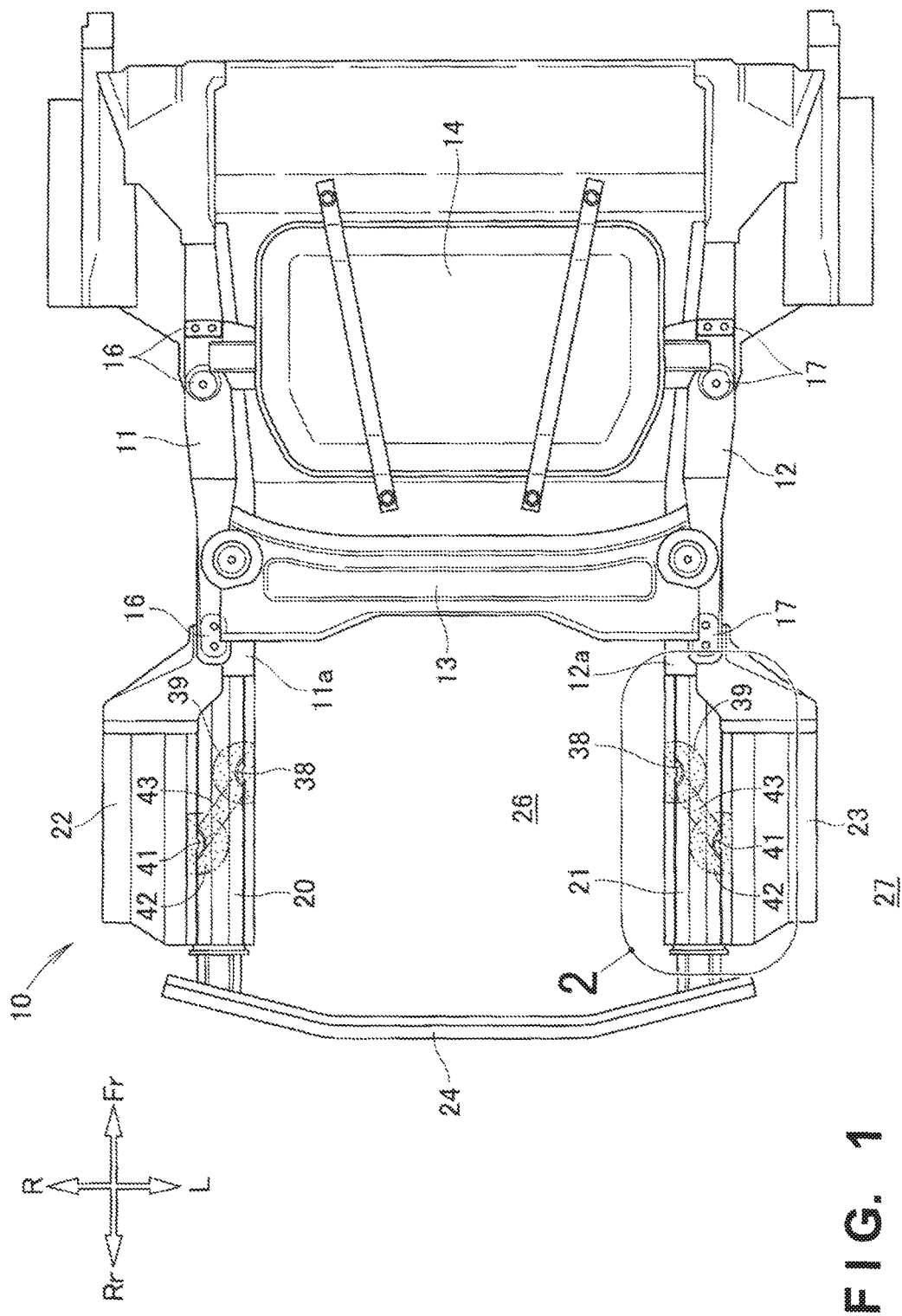
FIG. 1 is a bottom view of a vehicle body rear structure including a vehicle body frame according to the present invention.

As shown in FIG. 1, a vehicle body rear structure 10 includes a right rear frame front portion 11 provided on the right side almost at the center in the vehicle longitudinal direction, a left rear frame front portion 12 provided on the left side almost at the center in the vehicle longitudinal direction, a rear cross member 13 bridged between a rear end 11a of the right rear frame front portion 11 and a rear end 12a of the left rear frame front portion 12, and a fuel tank 14 provided on the front side with respect to the rear cross member 13 in the vehicle body.

The vehicle body rear structure 10 also includes the right rear frame rear portion (vehicle body frame) 20 extending from the rear end 11a of the right rear frame front portion 11 to the rear side of the vehicle body, a right rear floor side panel 22 projecting from the right rear frame rear portion 20 outward on the left side in the vehicle width direction, the left rear frame rear portion (vehicle body frame) 21 extending from the rear end 12a of the left rear frame front portion 12 to the rear side of the vehicle body, a left rear floor side panel 23 projecting from the left rear frame rear portion 21 outward on the right side in the vehicle width direction, and a rear bumper beam 24 bridged between the right rear frame rear portion 20 and the left rear frame rear portion 21.

Rear sub-frames (not shown) are attached to a right attachment portion 16 of the right rear frame front portion 11 and a left attachment portion 17 of the left rear frame front portion 12. The rear sub-frames support a left rear damper and a right rear damper. The fuel tank 14 is attached above the rear sub-frames on the front side.

Hence, the fuel tank 14 is protected by the rear sub-frames, the right rear frame front portion 11, the left rear frame front portion 12, and the rear cross member 13.

The right rear frame rear portion 20 extends from the rear end 11a of the right rear frame front portion 11 to the rear side of the vehicle body. The left rear frame rear portion 21 extends from the rear end 12a of the left rear frame front portion 12 to the rear side of the vehicle body.

The right rear frame rear portion 20 and the left rear frame rear portion 21 are members almost bilaterally symmetrical to each other. Hence, the same reference numerals as in the left rear frame rear portion 21 denote the corresponding components in the right rear frame rear portion 20. The left rear frame rear portion 21 will be described in detail, and a detailed description of the right rear frame rear portion 20 will be omitted.

Figure 2:
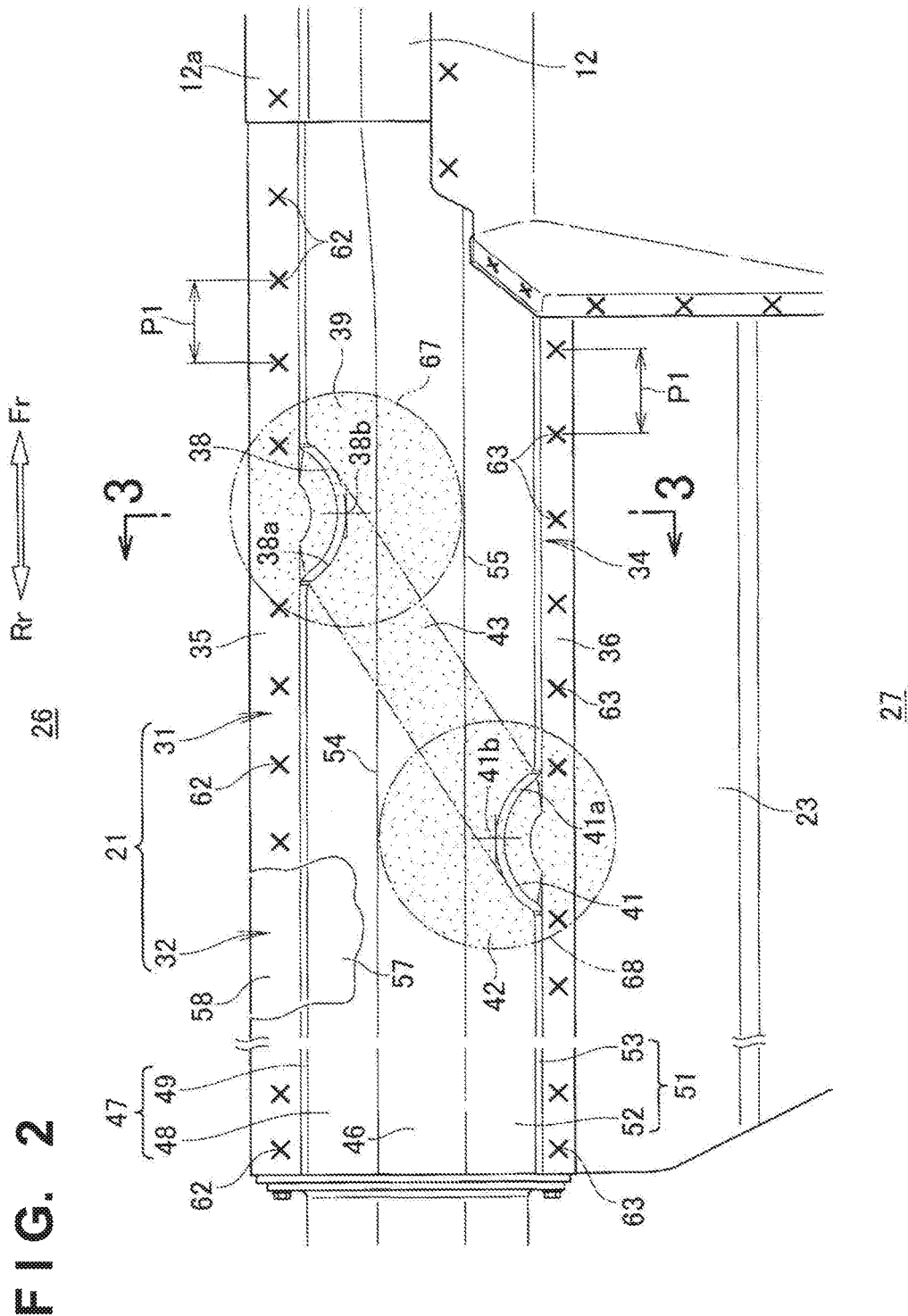
FIG. 2 is an enlarged view of a portion 2 in FIG. 1.
Figure 3:
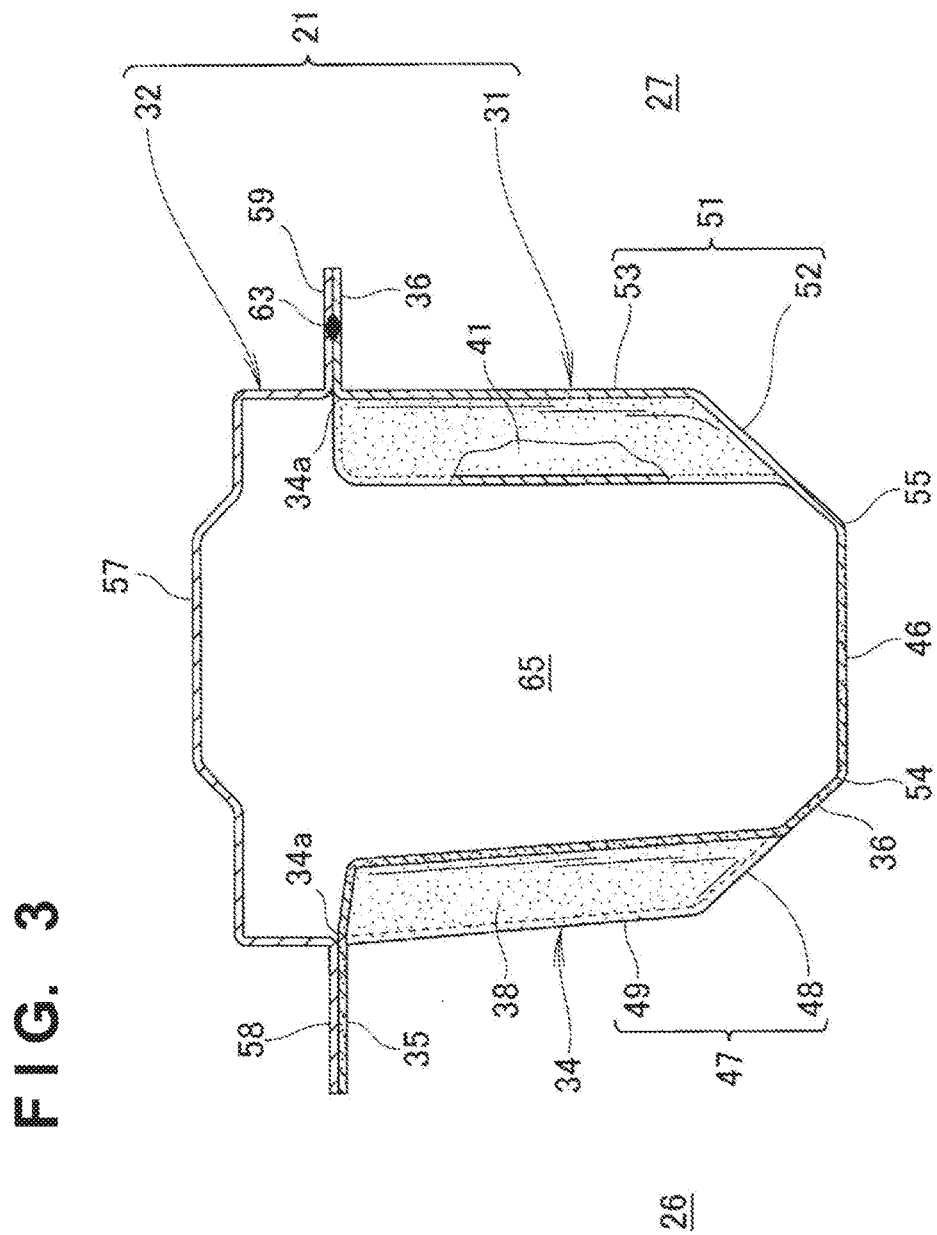
FIG. 3 is a sectional view taken along a line 3-3 in FIG. 2.

As shown in FIGS. 2 and 3, the left rear frame rear portion 21 includes a lower frame portion 31 with a U-shaped portion 34 formed into an almost U-shaped section, and an upper frame portion (top portion) 32 joined to the lower frame portion 31 to close the opening of the U-shaped portion 34 from above.

As for the lower frame portion 31, when hot-stamping (that is, hot-pressing) a heated blank material of a steel plate using a forming die, the material contacts the forming die and is quickly cooled and formed into a high-strength member having a tensile strength of about 1500 MPa. More specifically, the lower frame portion 31 is formed into a high-strength member having a tensile strength more than 1500 MPa.

As for the upper frame portion 32, like the lower frame portion 31, when hot-stamping a heated blank material of a steel plate using a forming die, the material contacts the forming die and is quickly cooled and formed into a high-strength member having a tensile strength of about 1500 MPa. More specifically, the upper frame portion 32 is formed into a high-strength member having a tensile strength more than 1500 MPa.

The lower frame portion 31 and the upper frame portion 32 are joined by flanges 35 and 58 (to be described later) and also joined by flanges 36 and 59 (to be described later). The left rear frame rear portion 21 is thus formed into a high-strength frame by the lower frame portion 31 and the upper frame portion 32.

When the frame of the high-strength member is used, the board thickness of the left rear frame rear portion 21 can be suppressed small, and the weight of the left rear frame rear portion 21 can be reduced.

Note that if the target impact energy absorption amount is small, a steel plate of a normal strength can be used for one of the lower frame portion 31 and the upper frame portion 32.

The lower frame portion 31 includes the U-shaped portion 34 formed into an almost U-shaped section, the lower inner flange 35 projecting from an opening 34*a* of the U-shaped portion 34 to an inside 26, and the lower outer flange 36 projecting from the opening 34*a* of the U-shaped portion 34 to an outside 27.

The lower frame portion 31 also includes a first vertical bead portion 38 formed on an inner wall 47 of het U-shaped portion 34, a first strain development region 39 located around the first vertical bead portion 38, a second vertical bead portion 41 formed on an outer wall 51 of het U-shaped portion 34, a second strain development region 42 located around the second vertical bead portion 41, and a soft portion 43 that connects the first vertical bead portion 38 and the second vertical bead portion 41.

The U-shaped portion 34 includes a bottom portion 46 formed flat, the inner wall (one of a pair of side walls) 47 bend upward from the inner side of the bottom portion 46, the outer wall (the other of the pair of side walls) 51 bend upward from the outer side of the bottom portion 46, an inner ridge line (one of one ridge line) 54 formed by the intersection between the bottom portion 46 and the inner wall 47, and an outer ridge line (the other of a pair of ridge lines) 55 formed by the intersection between the bottom portion 46 and the outer wall 51.

The U-shaped portion 34 is formed into an almost U-shaped section by the bottom portion 46, the inner wall 47, and the outer wall 51.

The lower inner flange 35 almost horizontally projects from the upper end of the inner wall 47 to the inside 26. The lower outer flange 36 almost horizontally projects from the upper end of the outer wall 51 to the outside 27.

The lower frame portion 31 is formed into an almost hat-shaped section by the U-shaped portion 34, the lower inner flange 35, and the lower outer flange 36.

The lower inner flange 35 and the lower outer flange 36 are heated by a laser and then slowly cooled so as to be annealed into ductile soft zones. That is, the lower inner flange 35 and the lower outer flange 36 are portions that can be joined by, for example, spot welding.

As another method of forming soft zones, the cooling speed may be reduced in hot stamping, or a heat treatment may be performed after hot stamping to do annealing to form ductile soft zones.

The inner wall 47 includes a first inner wall 48 bent from the inner side of the bottom portion 46 obliquely upward to the inside 26, and a second inner wall 49 bent upward from the upper side of the first inner wall 48.

That is, the inner wall 47 is formed into an almost V-shaped section by the first inner wall 48 and the second inner wall 49. In addition, the inner ridge line 54 is formed by the intersection between the bottom portion 46 and the first inner wall 48.

The outer wall 51 includes a first outer wall 52 bent from the outer side of the bottom portion 46 obliquely upward to the outside 27, and a second outer wall 53 bent upward from the upper side of the first outer wall 52.

That is, the outer wall 51 is formed into an almost V-shaped section by the first outer wall 52 and the second outer wall 53. In addition, the outer ridge line 55 is formed by the intersection between the bottom portion 46 and the first outer wall 52.

The upper frame portion 32 is joined to the lower frame portion 31 from above.

The upper frame portion 32 includes a projecting portion 57 arranged above the opening 34*a* of the U-shaped portion 34, the upper inner flange 58 almost horizontally projecting from the inner side of the projecting portion 57 to the inside 26, and the upper outer flange 59 almost horizontally projecting from the outer side of the projecting portion 57 to the outside 27.

When using a steel plate as a high-strength member, the upper inner flange 58 and the upper outer flange 59 are heated by a laser and then slowly cooled so as to be annealed into ductile soft zones. That is, the upper inner flange 58 and the upper outer flange 59 are portions that can be joined by, for example, spot welding.

As another method of forming soft zones, the cooling speed may be reduced in hot stamping, or annealing may be performed by a heat treatment after hot stamping.

The upper inner flange 58 is joined to the lower inner flange 35 from above, and simultaneously, the upper outer flange 59 is joined to the lower outer flange 36 from above.

In this state, the upper inner flange 58 and the lower inner flange 35 are joined at inner joint portions 62 of spot welding. In addition, the upper outer flange 59 and the lower outer flange 36 are joined at outer joint portions 63 of spot welding.

The upper frame portion 32 is thus joined to the lower frame portion 31.

The reason why the lower inner flange 35, the lower outer flange 36, the upper inner flange 58, and the upper outer flange 59 are annealed into soft zones will be described here.

That is, generally, if a hot-stamped steel plate as a high-strength member having a tensile strength more than 1500 MPa is welded, the welded portion softens to about 590 MPa to form a soft portion. Hence, a hard portion (that is, the hot-stamped high-strength member) having a tensile strength more than 1500 MPa exists around the soft portion. For this reason, the strength difference increases between the soft portion and the hard portion.

To suppress the strength difference in the lower frame portion 31, the lower inner flange 35 and the lower outer flange 36 of the lower frame portion 31 are partially softened by annealing into a strip shape to form soft zones.

It is also considered that a steel plate with a tensile strength of about 590 MPa is used as the upper frame portion 32. In this case, the upper frame portion 32 need not be partially softened by annealing into a strip shape.

However, the tensile strength of the upper frame portion 32 according to the embodiment exceeds 1500 MPa. Hence, the upper inner flange 58 and the upper outer flange 59 are also partially softened by annealing into a strip shape to form soft zones, like the lower inner flange 35 and the lower outer flange 36.

Hence, the upper inner flange 58 and the lower inner flange 35 are satisfactorily joined at the inner joint portions 62. In addition, the upper outer flange 59 and the lower outer flange 36 are satisfactorily joined at the outer joint portions 63.

Accordingly, the opening 34a of the U-shaped portion 34 is covered by the upper frame portion 32. In this state, the left rear frame rear portion 21 is formed into a hollow closed section by the lower frame portion 31 and the upper frame portion 32. In other words, the left rear frame rear portion 21 is formed into a frame having a hollow 65 by the lower frame portion 31 and the upper frame portion 32.

The upper inner flange 58 and the lower inner flange 35 are spot-welded such that the inner joint portions 62 have a pitch P1 in portions except the first vertical bead portion 38.

Similarly, the upper outer flange 59 and the lower outer flange 36 are spot-welded such that the outer joint portions 63 have the pitch P1 in portions except the second vertical bead portion 41.

The reason why spot welding is done such that the inner joint portions 62 and the outer joint portions 63 have the pitch P1 will be described later in detail.

Figure 4:
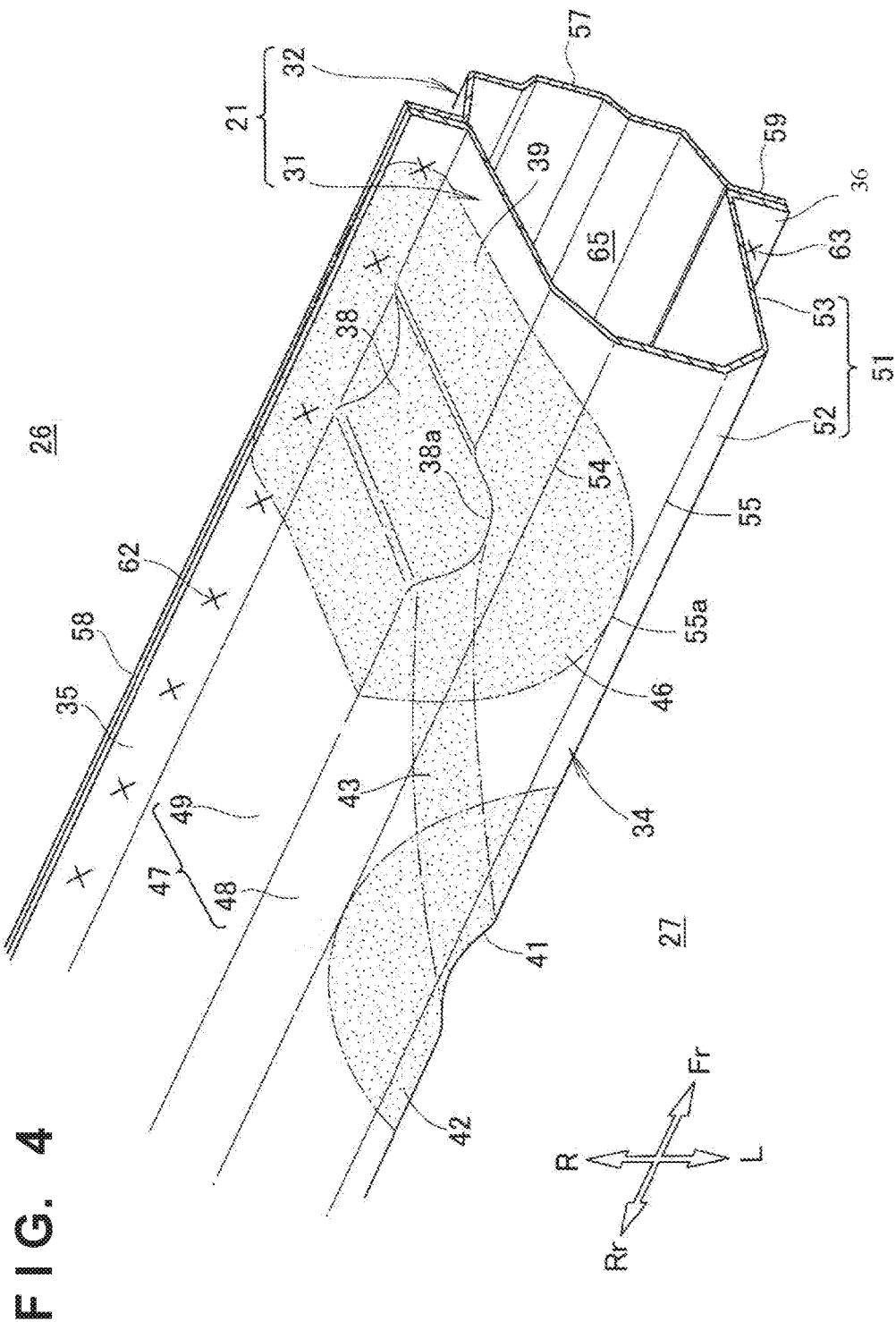
FIG. 4 is a perspective view showing a left rear frame rear portion shown in FIG. 2.

As shown in FIG. 4, the first vertical bead portion 38 is formed on the inner wall 47 of the U-shaped portion 34. The first vertical bead portion 38 is formed on the inner wall 47 into a concave shape with a section curved (more specifically, arc) toward the hollow 65, and extends in the vertical direction. A lower end 38a of the first vertical bead portion 38 is located adjacent to the inner ridge line 54.

The first strain development region 39 is formed around the first vertical bead portion 38.

Figure 5:
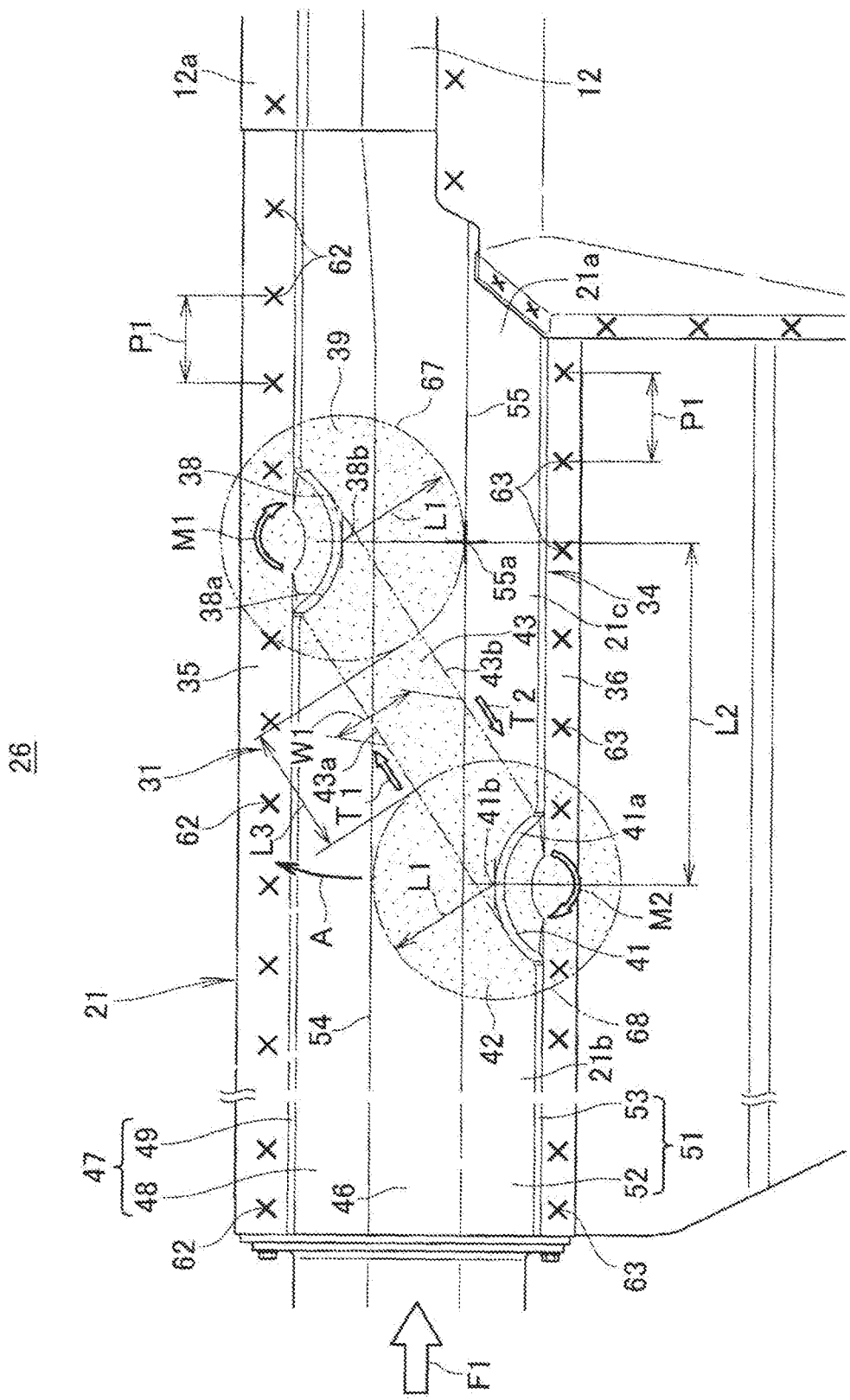
FIG. 5 is a bottom view showing a state in which an impact load is input to the left rear frame rear portion shown in FIG. 2.

As shown in FIG. 5, the first strain development region 39 is defined by an arc 67 having, as a radius, a minimum distance L1 in the vehicle width direction of the distance between the first vertical bead portion 38 and the outer ridge line 55. That is, the inside of the arc 67 having a portion 38b of the first vertical bead portion 38 closest to the outer ridge line 55 as the center and having the distance L1 as the radius is the first strain development region 39.

The first vertical bead portion 38 and the first strain development region 39 are heated by a laser and then slowly cooled so as to be annealed. Hence, the first vertical bead portion 38 and the first strain development region 39 are softened from a high strength of about 1500 MPa to 590 to 1000 MPa.

That is, the first vertical bead portion 38 and the first strain development region 39 are ductile deformable regions (so-called soft zones).

The reason why the first vertical bead portion 38 and the first strain development region 39 are softened to 590 to 1000 MPa is as follows.

That is, it is difficult to soften the first vertical bead portion 38 and the first strain development region 39 by annealing to a tensile strength less than 590 MPa. In addition, if the tensile strength exceeds 1000 MPa, the first vertical bead portion 38 and the first strain development region 39 may rupture because they are too hard.

Note that the first vertical bead portion 38 and the first strain development region 39 are most preferably softened to 780 MPa.

The second vertical bead portion 41 is formed on the outer wall 51 of the U-shaped portion 34. The second vertical bead portion 41 is formed on the outer wall 51 into a concave shape with a section curved (more specifically, arc) toward the hollow 65, and extends in the vertical direction. A lower end 41a of the second vertical bead portion 41 is located adjacent to the outer ridge line 55.

The second strain development region 42 is formed around the second vertical bead portion 41.

Like the first strain development region 39, the second strain development region 42 is defined by an arc 68 having, as a radius, the minimum distance L1 in the vehicle width direction of the distance between the second vertical bead portion 41 and the inner ridge line 54. That is, the inside of the arc 68 having a portion 41b of the second vertical bead portion 41 closest to the inner ridge line 54 as the center and having the distance L1 as the radius is the second strain development region 42.

The second vertical bead portion 41 and the second strain development region 42 are heated by a laser and then slowly cooled so as to be annealed, like the first vertical bead portion 38 and the first strain development region 39. Hence, the second vertical bead portion 41 and the second strain development region 42 are softened from a high strength of about 1500 MPa to 590 to 1000 MPa.

That is, the second vertical bead portion 41 and the second strain development region 42 are ductile deformable regions (so-called soft zones).

Note that the second vertical bead portion 41 and the second strain development region 42 are most preferably softened to 780 MPa, like the first vertical bead portion 38 and the first strain development region 39.

As described above, the first vertical bead portion 38 and the second vertical bead portion 41 are formed into ductile deformable regions. Hence, the first vertical bead portion 38 and the second vertical bead portion 41 can suitably be deformed by an impact load F1 input to the left rear frame rear portion 21.

Accordingly, the central portion of the left rear frame rear portion 21 in the vehicle longitudinal direction (longitudinal direction) can be bent into a Z shape by the impact load F1 and thus buckled and deformed, and the impact load F1 can satisfactorily be absorbed.

That is, each of the first vertical bead portion 38 and the second vertical bead portion 41 functions as a trigger (that is, a starting point) to deform the left rear frame rear portion 21.

The first vertical bead portion 38 and the second vertical bead portion 41 are each formed into a concave shape with a section curved (more specifically, arc) toward the hollow 65. Hence, the central portion of the left rear frame rear portion 21 easily deforms in a direction to bend into a Z shape. This can prevent stress from concentrating on the first vertical bead portion 38 and the second vertical bead portion 41 to cause rupture.

The first vertical bead portion 38 is located on the front side with respect to the second vertical bead portion 41 in the vehicle body and on the opposite side wall (that is, the inner side of the vehicle body). In this state, the bottom portion 38b of the first vertical bead portion 38 and the bottom portion 41b of the second vertical bead portion 41 are spaced apart by a distance L2 in the longitudinal direction of the hollow left rear frame rear portion 21.

In addition, the first strain development region 39 and the second strain development region 42 are spaced apart by a distance L3. More specifically, the first strain development region 39 and the second strain development region 42 are spaced apart by the distance L3 in a state before deformation of the left rear frame rear portion 21.

Hence, after the first vertical bead portion 38 and the second vertical bead portion 41 start deforming, the first strain development region 39 and the second strain development region 42 start deforming.

When the first strain development region 39 and the second strain development region 42 deform, the second strain development region 42 displaces as indicated by an arrow A with respect to a portion 55a of the outer ridge line 55 corresponding to the first vertical bead portion 38 as the center.

The first strain development region 39 and the second strain development region 42 are spaced apart by the distance L3. It is therefore possible to efficiently individually deform the first strain development region 39 and the second strain development region 42.

The second vertical bead portion 41 can thus smoothly be displaced as indicated by the arrow A with respect to the portion 55a of the outer ridge line 55 corresponding to the first vertical bead portion 38 as the center. That is, it is possible to suitably buckle and deform the left rear frame rear portion 21 by bending it into a Z shape.

By suitably buckling and deforming the left rear frame rear portion 21 in this way, the impact load F1 can satisfactorily be absorbed even in collision against a soft object such as a vehicle, and the shock absorbing performance of the left rear frame rear portion 21 can be stabilized.

Figure 6:
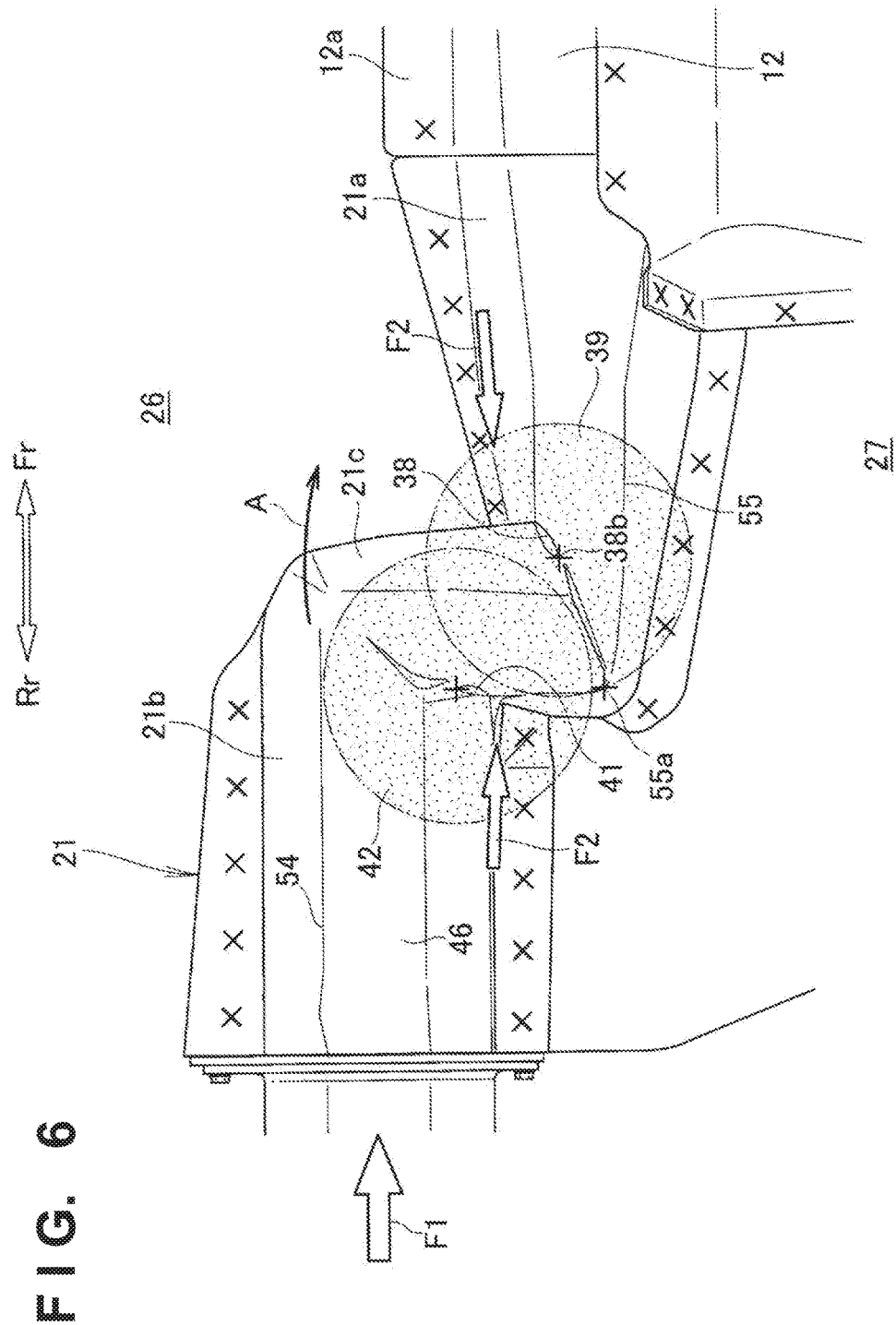
FIG. 6 is a bottom view showing a state in which the left rear frame rear portion shown in FIG. 5 buckles and deforms halfway.

As shown in FIG. 6, by smoothly displacing the second vertical bead portion 41 as indicated by the arrow A, the left rear frame rear portion 21 can be buckled and deformed into a bent state in a horizontal Z shape halfway through the deformation of the left rear frame rear portion 21.

More specifically, the left rear frame rear portion 21 is buckled and deformed into a bent state in a horizontal Z shape in a first frame 21a on the front side of the vehicle body, a second frame 21b on the rear side of the vehicle body, and a third frame 21c at the center of the left rear frame rear portion 21.

The first frame 21a on the front side of the vehicle body is a frame on the front side (that is, on the side of the first vertical bead portion 38) with respect to the first vertical bead portion 38 in the vehicle body. The second frame 21b on the rear side of the vehicle body is a frame on the rear side (that is, the second vertical bead portion 41) with respect to the second vertical bead portion 41 in the vehicle body.

The third frame 21c at the center is a frame between the first vertical bead portion 38 and the second vertical bead portion 41.

In a state in which the left rear frame rear portion 21 is buckled and deformed into a bent state in a horizontal Z shape, the first strain development region 39 and the second strain development region 42 are arranged so as to overlap each other. When the first strain development region 39 and the second strain development region 42 are arranged so as to overlap each other, the displacement of the second frame 21b inward (that is, to the inside 26) in the vehicle width direction can be suppressed small.

In other words, the shift between the first frame 21a and the second frame 21b in the vehicle width direction can be suppressed small.

Hence, in a state in which the first strain development region 39 and the second strain development region 42 overlap each other halfway through the deformation of the left rear frame rear portion 21, the first frame 21a and the second frame 21b can be arranged in line.

Accordingly, halfway through the deformation of the left rear frame rear portion 21, the first frame 21a and the second frame 21b can cause so-called secondary collision, and a reaction load F2 can be generated in the first frame 21a and the second frame 21b.

When the reaction load F2 is generated in the first frame 21a and the second frame 21b, the left rear frame rear portion 21 can more suitably be buckled and deformed, and the absorption amount of the impact load (impact energy) F1 can be increased.

Note that when the left rear frame rear portion 21 is rotated by 90° about the center in the longitudinal direction to arrange the second inner wall 49 and the second outer wall 53 (see FIG. 3) in the vertical direction, the left rear frame rear portion 21 can be bent into a vertical Z shape in the vertical direction.

In addition, when the left rear frame rear portion 21 is obliquely rotated by 0° to 90° about the center in the longitudinal direction, the left rear frame rear portion 21 can be bent into a Z shape in an oblique direction.

Figure 7:
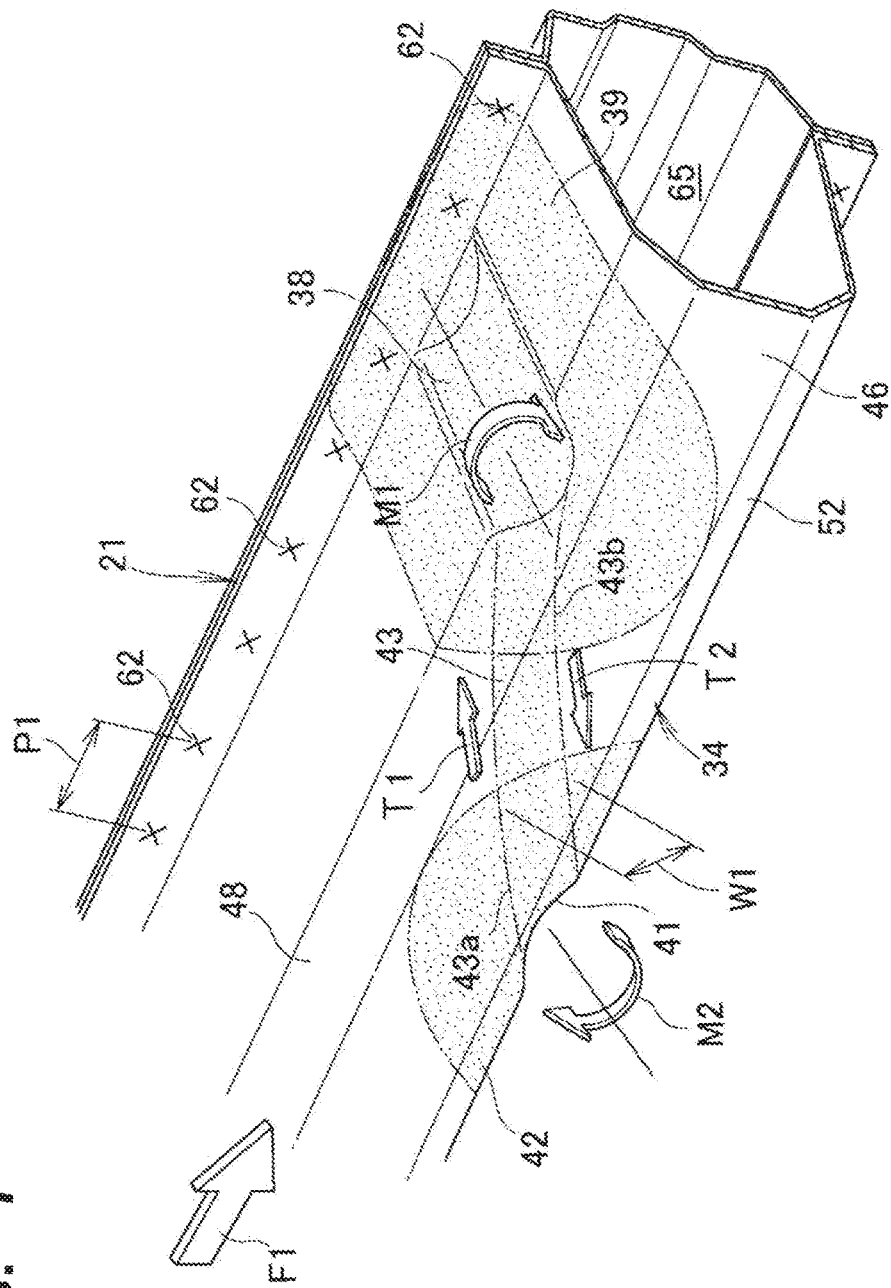
FIG. 7 is a perspective view showing a state in which an impact load is input to the left rear frame rear portion shown in FIG. 4.

As shown in FIGS. 5 and 7, the soft portion 43 extends to connect the first vertical bead portion 38 and the second vertical bead portion 41. More specifically, the soft portion 43 extends obliquely in a strip shape with a width W1 so as to connect the first vertical bead portion 38 and the second vertical bead portion 41 on the bottom portion 46, the first inner wall 48, and the first outer wall 52.

The soft portion 43 is heated by a laser and then slowly cooled so as to be annealed into a ductile soft zone. Hence, the soft portion 43 is softened from a high strength of about 1500 MPa to 590 to 1000 MPa.

Note that the soft portion 43 is most preferably softened to 780 MPa.

The reason why the soft portion 43 is softened to 590 to 1000 MPa is as follows.

That is, it is difficult to soften the soft portion 43 by annealing to a tensile strength less than 590 MPa. In addition, if the tensile strength exceeds 1000 MPa, the soft portion 43 may rupture because it is too hard.

As another method of forming the soft portion 43, the cooling speed may be reduced in hot stamping, or annealing may be performed by a heat treatment after hot stamping.

As described above, the soft portion 43 is annealed to be deformable, like the first vertical bead portion 38 and the first strain development region 39 or the second vertical bead portion 41 and the second strain development region 42.

The soft portion 43 is obliquely provided to connect the first vertical bead portion 38 and the second vertical bead portion 41.

Hence, if the impact load F1 is input to the left rear frame rear portion 21, shearing forces T1 and T2 in opposite directions are generated in one side 43a and the other side 43b of the soft portion 43. The first vertical bead portion 38 and the second vertical bead portion 41 extend in a direction almost orthogonal of the soft portion 43. More specifically, the soft portion 43 is arranged almost horizontally, and the first vertical bead portion 38 and the second vertical bead portion 41 extend in the vertical direction.

Accordingly, a bending moment M1 that bends the first vertical bead portion 38 in the vehicle width direction (that is, toward the inside) of the left rear frame rear portion 21 is generated, and a bending moment M2 that bends the second vertical bead portion 41 in the vehicle width direction (that is, toward the inside) of the left rear frame rear portion 21 is generated.

The soft portion 43 is smoothly deformed by the bending moments M1 and M2, and buckling deformation caused by bending the left rear frame rear portion 21 into a Z shape can be promoted.

Additionally, when the soft portion 43 that connects the first vertical bead portion 38 and the second vertical bead portion 41 is provided, the high-strength portion (so-called hard zone) of the left rear frame rear portion 21 can be prevented from being cracked or ruptured by the impact load F1 input to the left rear frame rear portion 21.

As described above, when buckling deformation caused by bending the left rear frame rear portion 21 into a Z shape is promoted, and the high-strength portion of the left rear frame rear portion 21 is prevented from being cracked or ruptured, the shock absorbing performance of the left rear frame rear portion 21 can be stabilized.

The inner joint portions 62 and the outer joint portions 63 are arranged at the pitch P1.

It is also considered that, for example, the pitch P1 of the inner joint portions 62 and the outer joint portions 63 is so roughened that the hollow section of the left rear frame rear portion 21 cannot be maintained. However, if the pitch P1 is roughened, distortion may concentrate on the inner joint portions 62 and the outer joint portions 63 due to the impact load F1 input to the left rear frame rear portion 21.

Hence, the left rear frame rear portion 21 deforms at the inner joint portions 62 and the outer joint portions 63, and it is difficult to suitably buckle and deform the left rear frame rear portion 21 from the first vertical bead portion 38 and the second vertical bead portion 41.

On the other hand, in the left rear frame rear portion 21 according to the embodiment, the pitch P1 of the inner joint portions 62 and the outer joint portions 63 is fine such that the hollow section of the left rear frame rear portion 21 can be maintained. It is therefore possible to prevent distortion from concentrating on the inner joint portions 62 and the outer joint portions 63 due to the impact load F1 input to the left rear frame rear portion 21 and maintain the hollow section of the left rear frame rear portion 21.

Buckling deformation caused by bending the left rear frame rear portion 21 into a Z shape can thus be promoted.

Additionally, by preventing distortion concentration on the inner joint portions 62 and the outer joint portions 63 when deforming the left rear frame rear portion 21, the inner joint portions 62 and the outer joint portions 63 can be prevented from being cracked or ruptured.

As described above, by promoting buckling deformation caused by bending the left rear frame rear portion 21 into a Z shape and preventing the inner joint portions 62 and the outer joint portions 63 from being cracked or ruptured, the shock absorbing performance of the left rear frame rear portion 21 can be stabilized.

The inner joint portions 62 are located in portions except the first vertical bead portion 38, and the outer joint portions 63 are located in portions except the second vertical bead portion 41. Hence, deformation of the first vertical bead portion 38 is not suppressed by the inner joint portions 62, and deformation of the second vertical bead portion 41 is not suppressed by the outer joint portions 63.

It is therefore possible to satisfactorily buckle and deform the left rear frame rear portion 21 from the first vertical bead portion 38 and the second vertical bead portion 41 both serving as the starting points.

An example in which an impact load input to the left rear frame rear portion 21 is absorbed in a case in which a soft object (for example, a vehicle) offset-collides from the rear side of the vehicle body against the rear left side portion of the vehicle body rear structure 10 will be described with reference to FIGS. 8A to 10B. In FIG. 10B, the ordinate represents the impact load input to the left rear frame rear portion, and the abscissa represents the deformation amount of the left rear frame rear portion.

Figure 8A:
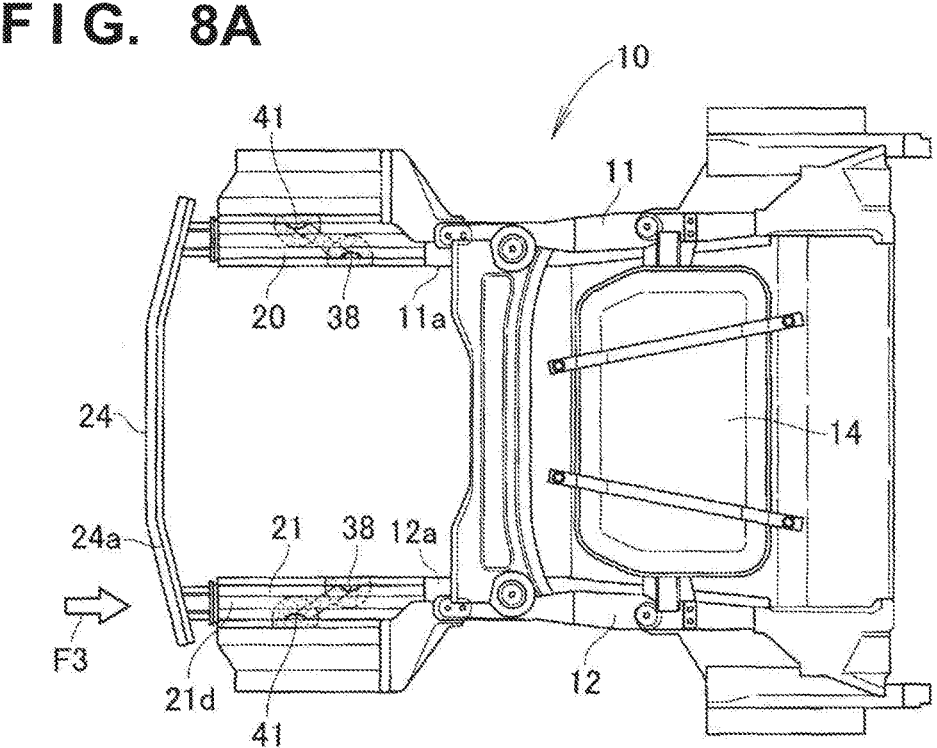
FIG. 8A shows a view for explaining an example in which an impact load is input to the rear end of the left rear frame rear portion according to the present invention.

As shown in FIG. 8A, a soft object such as a vehicle offset-collides from the rear side of the vehicle body against the rear left side portion of the vehicle body rear structure 10. Accordingly, an impact load F3 is input to a rear end 21d of the left rear frame rear portion 21 via a left side portion 24a of the rear bumper beam 24.

Figure 8B:
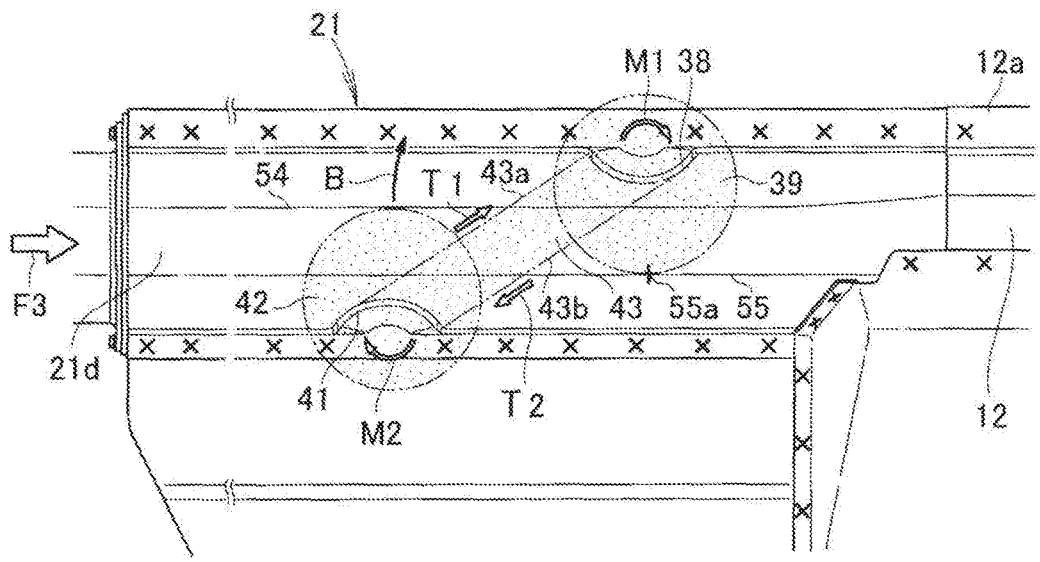
FIG. 8B shows a view for explaining an example in which an impact load is input to the rear end of the left rear frame rear portion according to the present invention.

As shown in FIG. 8B, the first vertical bead portion 38 and the second vertical bead portion 41 start deforming due to the input impact load F3. After the first vertical bead portion 38 and the second vertical bead portion 41 start deforming, the first strain development region 39 and the second strain development region 42 start deforming.

When the first strain development region 39 and the second strain development region 42 deform, the second strain development region 42 displaces as indicated by an arrow B with respect to the portion 55a of the outer ridge line 55 corresponding to the first vertical bead portion 38 as the center.

Figure 9A:
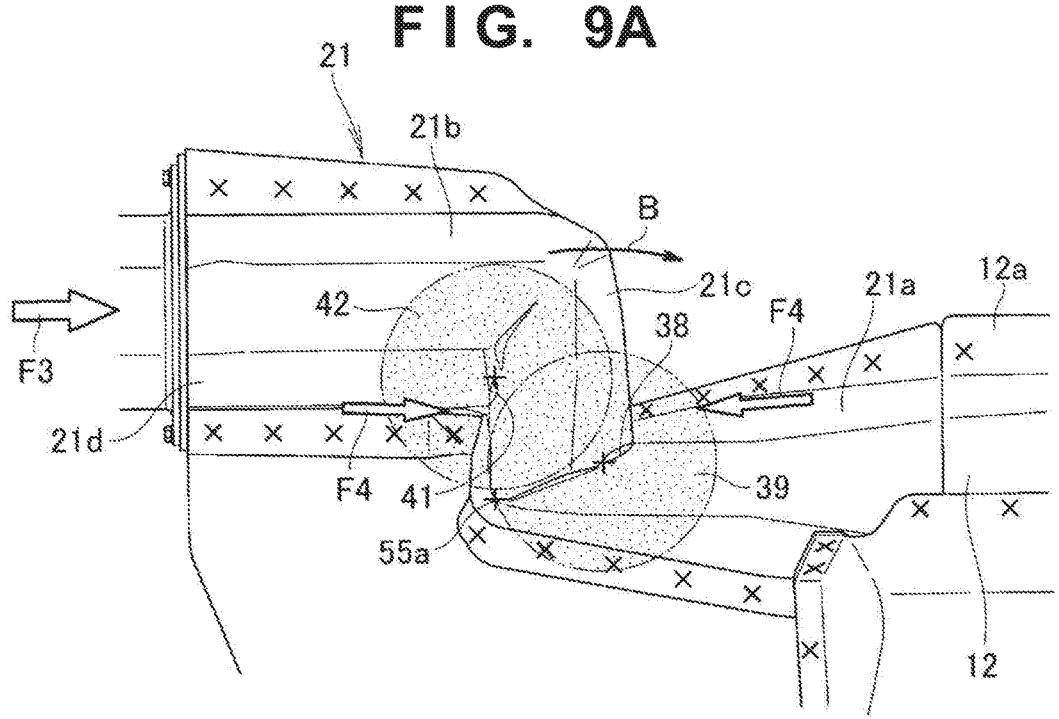
FIG. 9A shows a view for explaining an example in which the left rear frame rear portion according to the present invention buckles and deforms due to an impact load.

As shown in FIG. 9A, when the second vertical bead portion 41 is smoothly displaced as indicated by the arrow B, the left rear frame rear portion 21 buckles and deforms into a bent state in a horizontal Z shape halfway through the deformation of the left rear frame rear portion 21.

In this state, the first frame 21a and the second frame 21b of the left rear frame rear portion 21 cause so-called secondary collision, and a reaction load F4 is generated in the first frame 21a and the second frame 21b. By the reaction load F4, the left rear frame rear portion 21 can more suitably be buckled and deformed.

In this way, the left rear frame rear portion 21 is buckled and deformed into a bent state in a horizontal Z shape, and the left rear frame rear portion 21 is more suitably buckled and deformed by the reaction load F4. This can increase the absorption amount of the impact load (impact energy) F3.

Referring back to FIG. 8B, the soft portion 43 is obliquely provided to connect the first vertical bead portion 38 and the second vertical bead portion 41. Hence, if the impact load F3 is input to the left rear frame rear portion 21, the shearing forces T1 and T2 in opposite directions are generated in the one side 43a and the other side 43b of the soft portion 43, and the bending moments M1 and M2 are generated The soft portion 43 is smoothly deformed by the bending moments M1 and M2, and buckling deformation caused by bending the left rear frame rear portion 21 into a Z shape is promoted.

In addition, the pitch P1 of the inner joint portions 62 and the outer joint portions 63 is suppressed small. It is therefore possible to prevent distortion from concentrating on the inner joint portions 62 and the outer joint portions 63 due to the impact load F1 input to the left rear frame rear portion 21.

It is therefore possible to suitably bend the left rear frame rear portion 21 into a Z shape and buckle and deform it from the first vertical bead portion 38 and the second vertical bead portion 41.

Figure 9B:
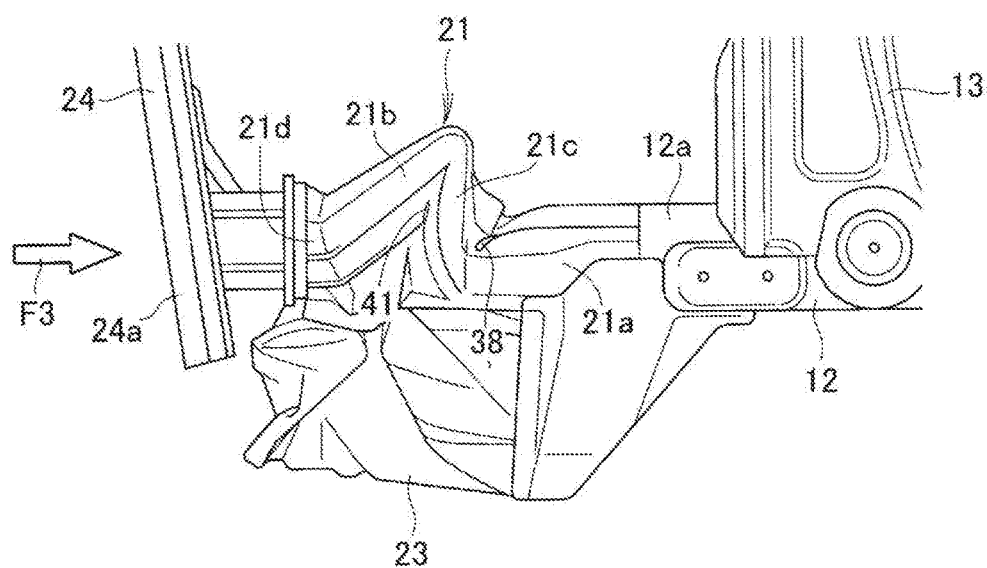
FIG. 9B shows a view for explaining an example in which the left rear frame rear portion according to the present invention buckles and deforms due to an impact load.

As shown in FIG. 9B, buckling deformation by the bent state of the left rear frame rear portion 21 in a horizontal Z shape is promoted. It is therefore possible to suitably deform the left rear frame rear portion 21 and satisfactorily absorb the impact load F3.

Figure 10A:
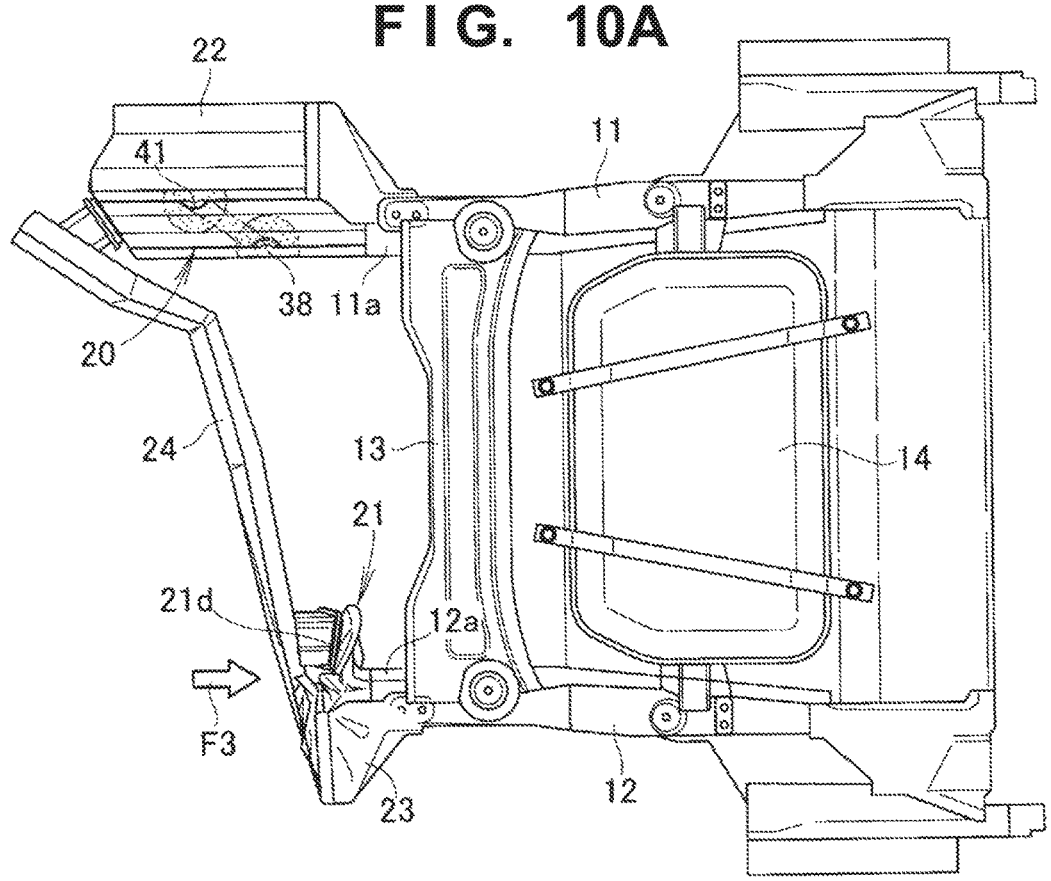
FIG. 10A is a view for explaining an example in which an impact load is absorbed by the left rear frame rear portion according to the present invention.
Figure 10B:
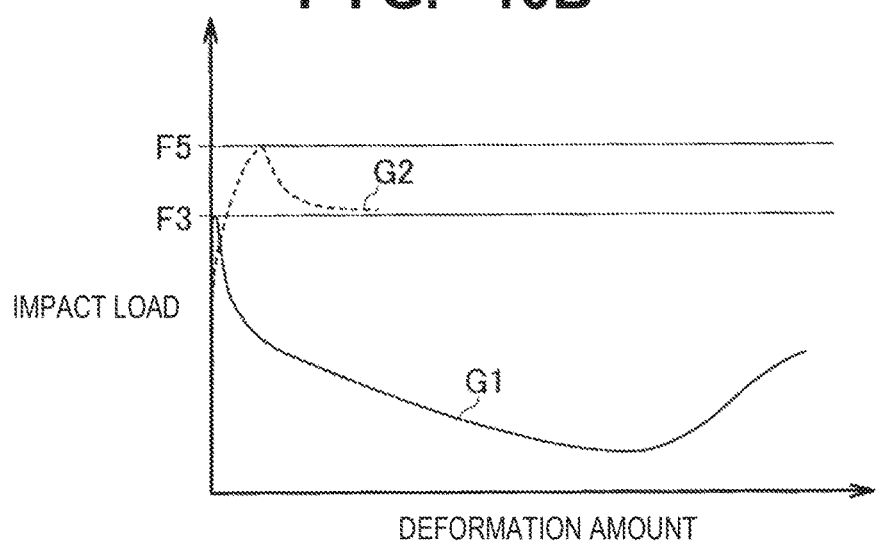
FIG. 10B is a graph for explaining a state in which an impact load is absorbed by the left rear frame rear portion according to the present invention.

As shown in FIG. 10A, the impact load F3 input to the rear end 21d of the left rear frame rear portion 21 by collision against a soft object such as a vehicle can satisfactorily be absorbed by bending the left rear frame rear portion 21 into a Z shape and buckling and deforming it.

A graph G1 shown in FIG. 10B represents a deformed state of the left rear frame rear portion 21 by the impact load F3. As can be seen from the graph G1, the left rear frame rear portion 21 starts buckling and deforming so as to be bent into a Z shape by the impact load F3, and after the start of buckling deformation, buckling deformation of the left rear frame rear portion 21 into the Z shape is smoothly promoted, and the impact load F3 is satisfactorily absorbed.

Referring back to FIG. 10A, when the impact load F3 is input to the rear end 21d of the left rear frame rear portion 21, the left rear frame rear portion 21 bends into a Z shape, thereby suppressing buckling deformation of the left rear frame front portion 12. In addition, the rear cross member 13 is provided at the rear end 12a of the left rear frame front portion 12.

Hence, the rear cross member 13 can be maintained in an undisplaceable state. It is therefore possible to protect the fuel tank 14 provided on the front side with respect to the rear cross member 13 in the vehicle body.

A graph G2 shown in FIG. 10B represents a deformed state of the left rear frame front portion 12 by the impact loads F3 and F5. As indicted by the graph G2, the left rear frame front portion 12 is formed to be buckled and deformed by the impact load F5. The impact load F5 is larger than the impact load F3.

That is, as can be seen from the graph G2, the left rear frame rear portion 21 does not deform by the impact load F3, and starts buckling and deforming by the impact load F5. Hence, when the impact load F3 is input to the left rear frame front portion 12, it is possible to suppress deformation of the left rear frame front portion 12 and protect the fuel tank 14.

As has been described with reference to FIGS. 8A to 10B, the left rear frame rear portion 21 is provided with the first vertical bead portion 38, the first strain development region 39, the second vertical bead portion 41, the second strain development region 42, and the soft portion 43. In addition, the pitch P1 (see FIG. 5) of the inner joint portions 62 and the outer joint portions 63 is suppressed small.

Accordingly, even in collision against a soft object such as a vehicle, it is possible to satisfactorily absorb the impact load F3 by suitably deforming the left rear frame rear portion 21 (more specifically, bending the left rear frame rear portion 21 into a Z shape to cause buckling deformation).

Note that the vehicle body frame according to the present invention is not limited to the above-described embodiment, and changes and improvements can be made as needed.

For example, in the embodiment, an example in which the right rear frame rear portion 20 or left rear frame rear portion 21 is buckled and deformed into a bent state in a horizontal Z shape has been described. However, the bending direction of the Z shape is not limited to the horizontal direction.

For example, as described above, when the left rear frame rear portion 21 is rotated by 90° about the center in the longitudinal direction, the left rear frame rear portion 21 can be bent in the vertical direction into a vertical Z shape. When the left rear frame rear portion 21 is obliquely rotated by 0° to 90° about the center in the longitudinal direction, the left rear frame rear portion 21 can obliquely be bent into a Z shape.

In the embodiment, an example in which the present invention is applied to the right rear frame rear portion 20 or left rear frame rear portion 21 as a vehicle body frame has been described. However, the present invention is not limited to this. For example, the present invention can also be applied to another frame such as a left front side frame or right front side frame.

In the embodiment, an example in which the inner ridge line is formed by the intersection between the bottom portion 46 and the inner wall 47, and the outer ridge line is formed by the intersection between the bottom portion 46 and the outer wall 51 has been described. However, the present invention is not limited to this.

For example, the upper frame portion 32, the inner wall 47, and the outer wall are integrally molded. In this state, the inner ridge line is formed by the intersection between the upper frame portion 32 and the inner wall 47. In addition, the outer ridge line can be formed by the intersection between the upper frame portion 32 and the outer wall 51.

In this case, the first vertical bead portion 38 is formed to be adjacent to the inner ridge line between the upper frame portion 32 and the inner wall 47. In addition, the second vertical bead portion 41 is formed to be adjacent to the outer ridge line between the upper frame portion 32 and the outer wall 51.

Alternatively, the inner ridge line 54 and the outer ridge line 55 are formed on the side of the bottom portion 46, and an inner ridge line and an outer ridge line can also be formed on the side of the upper frame portion 32. That is, the ridge lines are formed on both the side of the bottom portion 46 and the side of the upper frame portion 32.

In this case, for example, the first vertical bead portion 38 is formed to be adjacent to the inner ridge line 54 on the side of the bottom portion 46 and the inner ridge line on the side of the upper frame portion 32. In addition, the second vertical bead portion 41 is formed to be adjacent to the outer ridge line 55 on the side of the bottom portion 46 and the outer ridge line on the side of the upper frame portion 32.

In the embodiment, an example in which the soft portion 43 is formed on the bottom portion 46, the first inner wall 48, and the first outer wall 52 has been described. However, the present invention is not limited to this, and the soft portion may be formed on the upper frame portion 32.

That is, if an inner ridge line is formed by the intersection between the upper frame portion 32 and the inner wall 47, and an outer ridge line is formed by the intersection between the upper frame portion 32 and the outer wall 51, the soft portion is formed on the upper frame portion 32.

In the embodiment, an example in which the first vertical bead portion 38, the first strain development region 39, the second vertical bead portion 41, the second strain development region 42, and the soft portion 43 are annealed by a laser has been described. However, the present invention is not limited to this. For example, the first vertical bead portion 38, the first strain development region 39, the second vertical bead portion 41, the second strain development region 42, and the soft portion 43 may be annealed by another method such as high frequency induction heating.

High frequency induction heating is a heating method generally employed. The first vertical bead portion 38, the first strain development region 39, the second vertical bead portion 41, the second strain development region 42, and the soft portion 43 are heated by supplying an AC current to a coil.

As another annealing method, the cooling speed may be reduced when hot-stamping each portion, or annealing may be performed by a heat treatment after hot stamping, as described above.

Similarly, the lower inner flange 35, the lower outer flange 36, the upper inner flange 58, and the upper outer flange 59 can also be annealed not by annealing using a laser but by another method such as high frequency induction heating.

As another annealing method, the cooling speed may be reduced when hot-stamping each portion, or annealing may be performed by a heat treatment after hot stamping, as described above.

In the embodiment, an example in which the left rear frame rear portion 21 is buckled and deformed into a bent state in a Z shape by offset collision against the rear left side portion of the vehicle body rear structure 10 has been described. However, the present invention is not limited to this. For example, the right rear frame rear portion 20 can also be buckled and deformed into a bent state in a Z shape, like the left rear frame rear portion 21.

It is therefore possible to satisfactorily absorb the input impact load even when a vehicle collides against the whole rear portion of the vehicle body rear structure 10, or a vehicle offset-collides against the rear right side portion of the vehicle body rear structure 10.

In the embodiment, the closed sectional shape of the right rear frame rear portion 20 or left rear frame rear portion 21 is not limited to that shown in the embodiment, and can be changed to a rectangular shape or polygonal shape as needed.

That is, in the embodiment, a ridge line is formed on the inner wall by bending the inner wall 47, and a ridge line is formed on the outer wall by bending the outer wall 51. In addition, an example in which the first vertical bead portion 38 crosses the ridge line on the inner wall, and the second vertical bead portion 41 crosses the ridge line on the outer wall has been described. However, the present invention is not limited to this.

For example, a vertical wall may be formed instead of bending the inner wall 47 or outer wall 51. Alternatively, the inner wall 47 or outer wall 51 may be bent at a plurality of points to form a number of ridge lines on the inner wall 47 or outer wall 51, and the first vertical bead portion 38 or second vertical bead portion 41 may cross a number of ridge lines.

In any case, however, the inner ridge line 54 on which the inner wall 47 and the bottom portion 46 intersect needs to be formed so as not to make the first vertical bead portion 38 cross the inner ridge line 54. Similarly, the outer ridge line 55 on which the outer wall 51 and the bottom portion 46 intersect needs to be formed so as not to make the second vertical bead portion 41 cross the outer ridge line 55.

The reason why the first vertical bead portion 38 or second vertical bead portion 41 is not made to cross the ridge line is as follows. That is, if the first vertical bead portion 38 crosses the inner ridge line 54, and the second vertical bead portion 41 crosses the outer ridge line 55, the left rear frame rear portion 21 readily bends. For this reason, the reaction of the left rear frame rear portion 21 becomes small, and it is difficult to ensure the impact energy absorption amount.

In the embodiment, an example in which one set of the first vertical bead portion 38, the first strain development region 39, the second vertical bead portion 41, the second strain development region 42, and the soft portion 43 is provided in the left rear frame rear portion 21 has been described. However, the present invention is not limited to this.

For example, a plurality of sets of the first vertical bead portion 38, the first strain development region 39, the second vertical bead portion 41, the second strain development region 42, and the soft portion 43 are preferably provided in the left rear frame rear portion 21 in the vehicle longitudinal direction from the viewpoint of shock absorbing performance.

The shapes and structures of the vehicle body rear structure, the left and right rear frames, the lower frame portion, the upper frame portion, the U-shaped portion, the first vertical bead portion, the first strain development region, the second vertical bead portion, the second strain development region, the soft portion, the bottom portion, the inner and outer side walls, the inner and outer ridge lines, and the inner and outer joint portions are not limited to those exemplified in the embodiment, and can be changed as needed.

INDUSTRIAL APPLICABILITY

The present invention can suitably be applied to a vehicle including a vehicle body frame formed into a hollow by a top portion, a bottom portion, and a pair of side walls and having a pair of ridge lines on the top portion side or bottom portion side.

The invention claimed is:

1. A vehicle body frame formed into a hollow by a top portion, a bottom portion, and a pair of side walls, having a pair of ridge lines formed by intersections between at least one of the top portion and the bottom portion and the pair of side walls, and extending in a vehicle longitudinal direction, comprising:
   a first vertical bead portion formed on one of the pair of side walls into a concave shape toward the hollow, extending in a vertical direction, and located adjacent to one of the pair of ridge lines;
   a first strain development region having, as a radius, a minimum distance in a vehicle width direction, which is a distance between the first vertical bead portion and the other of the pair of ridge lines;
   a second vertical bead portion formed on the other of the pair of side walls into a concave shape toward the hollow, extending in the vertical direction, and located adjacent to the other of the pair of ridge lines; and
   a second strain development region having, as a radius, a minimum distance in the vehicle width direction, which is a distance between the second vertical bead portion and the one of the pair of ridge lines,
   wherein the first vertical bead portion and the second vertical bead portion are spaced apart in the vehicle longitudinal direction of the vehicle body frame, and the first strain development region and the second strain development region are spaced apart in a state before deformation of the vehicle body frame.

2. The vehicle body frame according to claim 1, wherein the first strain development region and the second strain development region overlap each other halfway through the deformation of the hollow vehicle body frame.

3. The vehicle body frame according to claim 1, wherein the hollow vehicle body frame is formed into a high strength of about 1500 MPa, and
   the first vertical bead portion and the second vertical bead portion are softened to 590 to 1000 MPa.

4. The vehicle body frame according to claim 1, wherein at least one of the top portion and the bottom portion includes a soft portion that is deformable and extends in a strip shape to connect the first vertical bead portion and the second vertical bead portion.

5. The vehicle body frame according to claim 1, wherein a U-shaped portion having a substantially U-shaped section is formed by the bottom portion and the pair of side walls, the top portion is joined to a lower frame portion including the U-shaped portion by spot welding, thereby forming the hollow vehicle body frame,
   the spot welding is located in a portion except the first vertical bead portion and the second vertical bead portion, and
   a pitch to prevent distortion concentration on a joint portion by the spot welding when deforming the vehicle body frame is set.

* * * * *